United States Patent
Horesh

(10) Patent No.: US 10,609,359 B2
(45) Date of Patent: Mar. 31, 2020

(54) DEPTH IMAGE PROVISION APPARATUS AND METHOD

(71) Applicant: Intel Corporation, Santa Clara, CA (US)

(72) Inventor: Nizan Horesh, Caesarea (IL)

(73) Assignee: Intel Corporation, Santa Clara, CA (US)

( * ) Notice: Subject to any disclaimer, the term of this patent is extended or adjusted under 35 U.S.C. 154(b) by 402 days.

(21) Appl. No.: 15/190,031

(22) Filed: Jun. 22, 2016

(65) Prior Publication Data

US 2017/0374352 A1 Dec. 28, 2017

(51) Int. Cl.
*H04N 13/00* (2018.01)
*H04N 13/239* (2018.01)
(Continued)

(52) U.S. Cl.
CPC ......... *H04N 13/239* (2018.05); *G01S 7/4817* (2013.01); *G01S 17/46* (2013.01);
(Continued)

(58) Field of Classification Search
CPC ........ H04N 13/04; H04N 13/00; H04N 13/02; H04N 13/0239; H04N 13/0296; H04N 13/0055; H04N 13/0271; H04N 5/256; H04N 5/23512; G06T 15/00; G01B 11/25; G01B 11/22
USPC ..................................... 348/47, 42; 345/419
See application file for complete search history.

(56) References Cited

U.S. PATENT DOCUMENTS

| | | | |
|---|---|---|---|
| 6,664,537 | B2 | 12/2003 | Engelhardt et al. |
| 7,103,212 | B2 | 9/2006 | Hager et al. |
| 1,259,777 | A1 | 8/2007 | Retschke et al. |
| 7,573,022 | B2 | 8/2009 | Choo et al. |
| 7,756,323 | B2 | 7/2010 | Kimmel |

(Continued)

FOREIGN PATENT DOCUMENTS

| | | |
|---|---|---|
| CN | 1308837 A | 8/2001 |
| CN | 101995657 A | 3/2011 |

(Continued)

OTHER PUBLICATIONS

Notice of Dismissal of Amendment issued Jan. 23, 2017, in corresponding Korean Patent Appln. No. 2014-7036593, 10 pages.

(Continued)

*Primary Examiner* — Sherrie Hsia
(74) *Attorney, Agent, or Firm* — Schwabe, Williamson & Wyatt, P.C.

(57) ABSTRACT

Apparatuses, methods and storage media for providing a depth image of an object are described. In some embodiments, the apparatus may include a projector to perform a controlled motion, to project a light pattern on different portions of the scene at different time instances, and an imaging device coupled with the projector, to generate pairs of images (a first image of a pair from a first perspective, and a second image of the pair from a second perspective), of different portions of the scene in response to the projection of the light pattern on respective portions. The apparatus may include a processor coupled with the projector and the imaging device, to control the motion of the projector, and generate the depth image of the object in the scene, based on processing of the generated pairs of images of the portions of the scene. Other embodiments may be described and claimed.

20 Claims, 8 Drawing Sheets

(51) Int. Cl.

| | | |
|---|---|---|
| *H04N 5/225* | (2006.01) | |
| *H04N 13/271* | (2018.01) | |
| *H04N 13/296* | (2018.01) | |
| *G01S 7/481* | (2006.01) | |
| *H04N 13/254* | (2018.01) | |
| *G01S 17/46* | (2006.01) | |
| *H04N 5/222* | (2006.01) | |

(52) U.S. Cl.
CPC ......... *H04N 5/2226* (2013.01); *H04N 5/2256* (2013.01); *H04N 5/2258* (2013.01); *H04N 13/254* (2018.05); *H04N 13/271* (2018.05); *H04N 13/296* (2018.05); *H04N 2013/0081* (2013.01)

(56) References Cited

U.S. PATENT DOCUMENTS

| | | | |
|---|---|---|---|
| 9,467,680 | B2 | 10/2016 | Kimmel et al. |
| 9,683,837 | B2 | 6/2017 | Siercks |
| 9,800,795 | B2 * | 10/2017 | Zabatani .............. H04N 5/2351 |
| 9,922,249 | B2 | 3/2018 | Kang et al. |
| 2005/0174579 | A1 | 8/2005 | Notni et al. |
| 2007/0115484 | A1 | 5/2007 | Huang et al. |
| 2008/0278566 | A1 | 11/2008 | Towner et al. |
| 2009/0262363 | A1 | 10/2009 | Keshavmurthy et al. |
| 2010/0067007 | A1 | 3/2010 | Vedeen et al. |
| 2010/0067554 | A1 | 3/2010 | Wysocki et al. |
| 2010/0207938 | A1 | 8/2010 | Yau et al. |
| 2011/0025860 | A1 | 2/2011 | Katougi et al. |
| 2011/0057930 | A1 | 3/2011 | Keller et al. |
| 2011/0134499 | A1 | 6/2011 | Konno et al. |
| 2012/0001961 | A1 | 1/2012 | Nishikawa et al. |
| 2012/0200829 | A1 | 8/2012 | Bronstein et al. |
| 2012/0262553 | A1 | 10/2012 | Chen et al. |
| 2013/0001834 | A1 | 1/2013 | El-Siblani et al. |
| 2013/0083384 | A1 | 4/2013 | Yamagata et al. |
| 2013/0141734 | A1 | 6/2013 | Aoki |
| 2014/0002337 | A1 | 1/2014 | Bandringa et al. |
| 2014/0125994 | A1 | 5/2014 | Kim et al. |
| 2014/0240492 | A1 | 8/2014 | Lee |
| 2014/0307057 | A1 | 10/2014 | Kang et al. |
| 2015/0161818 | A1 | 6/2015 | Komenczi et al. |
| 2015/0172435 | A1 | 6/2015 | Kimmel |
| 2015/0198800 | A1 | 7/2015 | Freedman et al. |
| 2015/0292863 | A1 | 10/2015 | Furihata et al. |
| 2015/0371393 | A1 | 12/2015 | Ramachandra et al. |
| 2016/0006914 | A1 | 1/2016 | Neumann |
| 2016/0373727 | A1 | 12/2016 | Kimmel et al. |

FOREIGN PATENT DOCUMENTS

| | | |
|---|---|---|
| CN | 201974159 U | 9/2011 |
| CN | 103033143 A | 4/2013 |
| CN | 103066487 A | 4/2013 |
| JP | 2003061936 A | 3/2003 |
| JP | 2003329955 A | 11/2003 |
| JP | 2007-010354 A | 1/2007 |
| JP | 2012202803 A | 10/2012 |
| KR | 1020100051139 A | 5/2010 |
| KR | 10-1541805 B1 | 8/2015 |
| TW | 479444 B | 3/2002 |
| WO | 2009124118 A1 | 10/2008 |
| WO | 2013054814 A1 | 4/2013 |
| WO | 2015184308 A1 | 12/2015 |

OTHER PUBLICATIONS

Roger Y. Tsai, "A versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, pp. 323-344.
Notice of Allowance dated Feb. 1, 2017, issued in related U.S. Appl. No. 14/128,915 16 pages.
Notice of Allowance dated Mar. 17, 2017, issued in related U.S. Appl. No. 14/128,915, 13 pages.
Communication pursuant to Article 94(3) EPC, dated Apr. 5, 2017, issued in corresponding European Patent Application No. 13888254.3, 5 pages.
Non-Final Office Action dated Oct. 24, 2016, issued in corresponding U.S. Appl. No. 15/251,578, 12 pages.
Second Office Action dated Oct. 10, 2016, issued in corresponding Chinese Patent Application No. 201380033389.3.
Notice of Final Rejection dated Nov. 24, 2016, issued in corresponding Korean Patent Application No. 2014-7036593.
Supplementary European Search Report dated Dec. 23, 2016, issued in corresponding European Patent Application No. 13888254.3, 10 pages.
Non-Final Office Action dated Oct. 6, 2016, issued in corresponding U.S. Appl. No. 14/128,915, 54 pages.
Inilabs, Dynamic Vision Sensor <<http://inilabs.com/products/dynamic-vision-sensors/>> last visited Jul. 27, 2016, 7 pages.
Lecture 09: Stereo Algorithms, Robert Collins, Robert Collins, <<http://www.cse.psu.edu/~rtc12/CSE486/lecture09.pdf>>, last visited Jul. 27, 2016.
Non-Final Office Action dated Mar. 28, 2016, issued in related U.S. Appl. No. 14/104,242, filed Dec. 12, 2013.
Notice of Allowance dated Jun. 16, 2016, issued in related U.S. Appl. No. 14/104,242, filed Dec. 12, 2013.
Non-Final Office Action dated Dec. 18, 2015, issued in related U.S. Appl. No. 14/128,915, filed Dec. 23, 2013.
Final Office Action dated Apr. 29, 2016, issued in related U.S. Appl. No. 14/128,915, filed Dec. 23, 2013.
International Preliminary Report on Patentability dated Jun. 23, 2016, issued in corresponding International Application No. PCT/US2014/066460.
International Search Report and Written Opinion dated Mar. 21, 2014 for International Application No. PCT/US2013/048611, 12 pages.
TW Office Action for TW Application No. 103119562, dated Jun. 25, 2015, 13 pages.
First Office Action dated Feb. 19, 2016, issued in corresponding Chinese Patent Application No. 201380033389.3, 8 pages.
International Preliminary Report on Patentability dated Jan. 7, 2016, issued in corresponding International Application No. PCT/US2013/048611, 9 pages.
Notice of Preliminary Rejection dated May 17, 2016, issued in corresponding Korean Patent Application No. 2014-7036593, 20 pages.
International Search Report for PCT Application No. PCT/US2014/066460, dated Mar. 13, 2015, 15 pages.
O. Rubinstein, et al.,3D color video camera, InProc. of Workshop on 3D Digital Imaging and Modeling( 3DIM), 2009.
Milanovic et al., "Memseye for Optical 3D Tracking and Imaging Applications", Transducers 2011 Conference, Jun. 5-9, 2011, Beijing, China, 4 pages.
Lecture 16. Stereo and 3D Vision. © UW CSE vision faculty, https://courses.cs.washington.edu/courses/cse455/09wi/.../lect16.pdf., <<last visited Jun. 20, 2016,>> 53 pages.
Developing for the Intel® RealSense™ Camera (SR300), https://software.intel.com/en-us/realsense/sr300camera,<< last visited May 9, 2016>> 3 pages.
Notice of Reason(s) for Rejection dated Dec. 15, 2015, issued in corresponding Japanese Patent Application No. 2015-524290, 6 pages.
U.S. Appl. No. 15/187,738, entitled "Depth Image Provision Apparatus and Method," filed Jun. 20, 2016.
Collins, R., "Lecture 09: Stereo Algorithms.," CSE486, Penn State, http://www.cse.psu.edu/~rtc12/CSE486/lecture09_6pp.pdf, 7 pages.
International Search Report & Written Opinion, dated Aug. 18, 2017, issued in related International Application No. PCT/US2017/032982 16 pages.
International Search Report & Written Opinion, dated Jul. 24, 2017, issued in related International Application No. PCT/US2017/032543 14 pages.
Fourth Office Action dated Nov. 6, 2017 issued in related Chinese Patent Application No. 201380033389.3, 39 pages.

(56) References Cited

OTHER PUBLICATIONS

International Preliminary Report on Patentability dated Jan. 3, 2019 for International Patent Application No. PCT/US2017/032543; 11 pages.
Third Office Action dated Apr. 28, 2017, issued in related Chinese Patent Application No. 201380033389.3, 42 pages.
Office Action dated Aug. 21, 2019 for U.S. Appl. No. 15/187,738, 51 pages.

* cited by examiner

DEPTH IMAGE PROVISION APPARATUS AND METHOD

TECHNICAL FIELD

The present disclosure relates to the fields of computing and imaging, in particular, to apparatuses, methods and storage media associated with provision of depth images.

BACKGROUND

Current three-dimensional (3D) depth cameras include a conventional camera, an infrared laser projector, and an infrared camera (and sometimes a microphone array) to measure depth of an image, to enable gesture-based interaction, face recognition, immersive video conferencing and collaboration, gaming, and 3D scanning. The infrared projector may project a grid (in infrared light, which is invisible to the human eye) onto the scene and the infrared camera may record it to compute depth information. 3D cameras may be stand-alone or may be integrated into computers, such as desktops, laptops, tablets, 2-in-1 computers, game consoles, and the like. Current depth cameras, when in use, may require substantial energy consumption from an imager and processing units. Further, current depth cameras may suffer from limitations of the spatial resolution and the minimal object size that can be identified from images captured by the cameras.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of the present disclosure include techniques and configurations for an apparatus and method for providing a depth image of an object. In some embodiments, the apparatus may include a projector to perform a controlled motion, to project a light pattern on different portions of the scene at different time instances. The apparatus may further include an imaging device coupled with the projector, to generate pairs of images of the different portions of the scene in response to the projection of the light pattern on respective portions. Generating pairs of images may include acquiring a first image of a pair from a first perspective, and acquiring a second image of the pair from a second perspective, where the first and second perspectives may be different perspectives. The apparatus may further include a processor coupled with the projector and the imaging device, to control the motion of the projector, and generate the depth image of the object in the scene, based at least in part on processing of the generated pairs of images of the portions of the scene.

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other.

Figure 1:
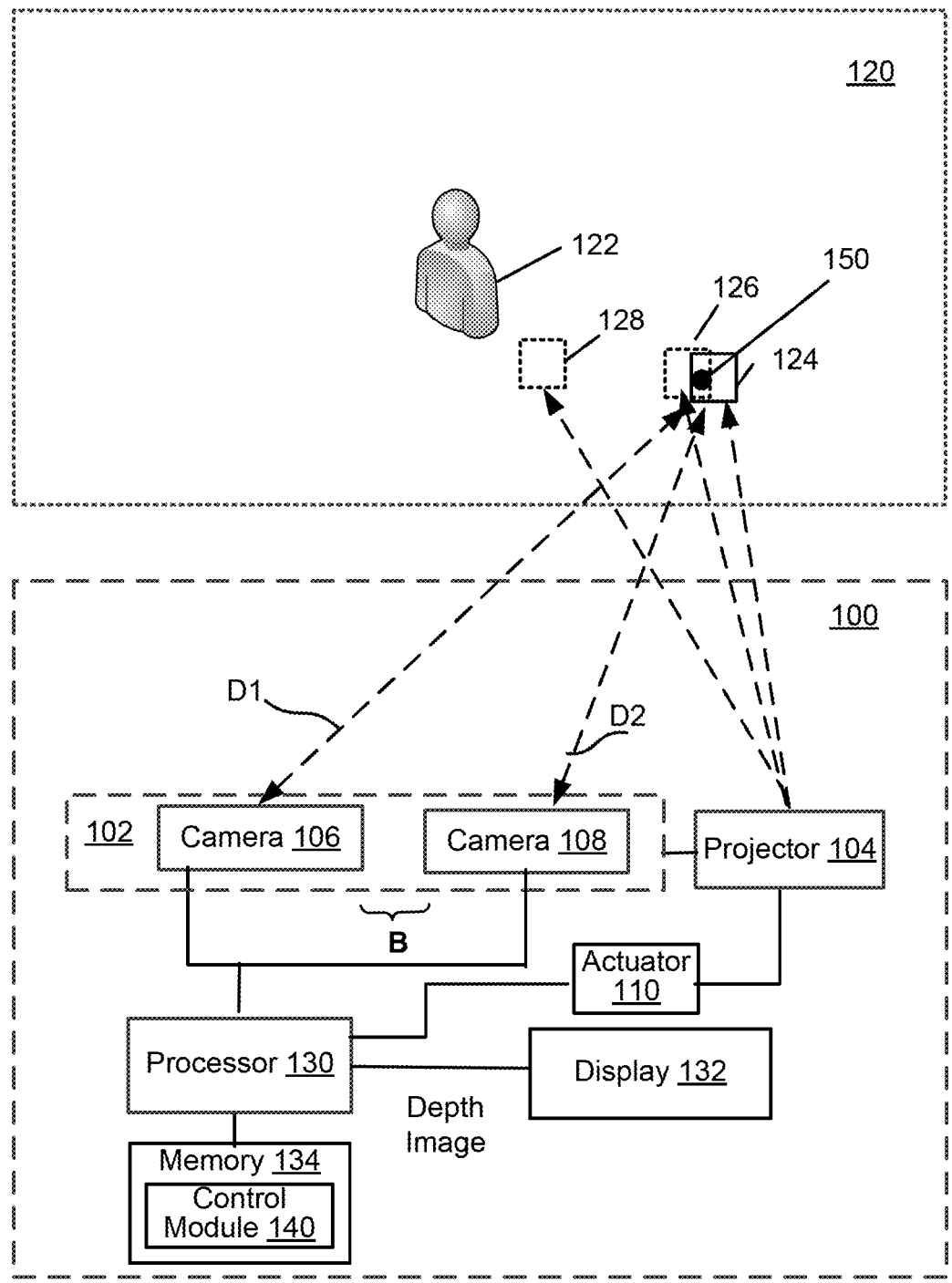
FIG. 1 is a block diagram illustrating an example apparatus for provision of a depth image of an object, in accordance with some embodiments.

FIG. 1 is a block diagram illustrating an example apparatus for provision of a depth image of an object, in accordance with some embodiments. In embodiments, the apparatus 100 may include an imaging device 102 coupled with a projector 104. The projector 104 may be configured to perform a controlled motion, to project a light pattern 124 on different portions of a scene 120 at different time instances. The controlled motion may include a beam steering of a beam forming the light pattern, to move the pattern in a controlled manner. The light pattern 124 may include, for example, a spot of light that may take different dimensions and shapes (e.g., rectangular as shown, circular, or others), and provide a desired contrast value. There are many possible projector patterns that may be used. In embodiments, the projector motion may be substantially continuous, to cover a region (portion) of the image. When a series of images is to be acquired (as described more fully below), for a pixel during the motion of the projector, this series may be unique among the other series taken along the same epipolar line (i.e., image line in the rectified image) with the desired disparity range. As shown, the scene 120 may include one or more objects 122, which may include still and/or moving objects, such as a person in this illustrative example. A plurality of pairs of images of the portions of the scene 120 may be acquired in response to the projection of the light pattern. The pairs of images of the portions of the scene 120 acquired may be processed according to various embodiments described herein, and a corresponding depth image of the object 122 in the scene 120 may be generated based on the results of the processing.

In general, the projector 104 may include any projector that may be caused to move the light pattern across the scene 120 in a controlled manner, e.g., continuously or periodically. For example, the projector 104 may be caused to project the light pattern 124, 126, 128 in one direction, e.g., horizontal or vertical direction, across the scene 120, with a step (distance between light spots) of a particular size (e.g., size of a light spot in one embodiment or a pixel size in another embodiment), between successive image acquisitions. In general, the projector 104 may be caused to project the light pattern on portions of the scene 120 in a random fashion. In embodiments, the projector 104 may be coupled with, and operated by, an actuator 110, to control the projector 104's motion, as described in reference to FIG. 2 in greater detail.

The imaging device 102 may be configured to generate pairs of images of the different portions of the scene 120 to image a portion of the scene lightened by the projector 104, in response to the projection of the light pattern by the projector 104 on the portions of the scene 120. The imaging device 102 may comprise an infrared (IR) camera or a regular camera. In embodiments, the imaging device 102 may include a first (e.g., left) camera 106 and a second (e.g., right) camera 108 disposed at a distance B from the first camera 106. The cameras 106 and 108 may generate pairs of images of the portions of the scene 120, taken from different perspectives. The perspectives may be defined in part by a distance B between the cameras 106 and 108 and/or by respective distances D1, D2 from the cameras 106, 108 to a particular point (e.g., 150) in the scene 120. Accordingly, camera 106 may acquire a first image of a pair of images from a first perspective, and camera 108 may acquire a second image of the pair of images from a second perspective, where the first and second perspectives may be different perspectives, as shown in FIG. 1.

In embodiments, the imaging device 102 may include one camera (e.g., 106 or 108) coupled with the projector 104. The camera may acquire one image of the pair of images. Since the geometry of the projector is known, the depth map may be computed from a single view by, for example, using a synthetic image of the projected pattern as the second image in the stereo pair. In other words, the projector 104 may be calibrated such that its position at each time instance of image acquisition by the camera 106 or 108 may be known, and therefore, a corresponding image of the pattern may be synthesized and an accurate depth map may be inferred from a single image, as is done in a structured light method, for example.

The apparatus 100 may further include a processor 130 coupled with the projector 104 (e.g., via the actuator 110), and the imaging device 102. The processor 130 may be configured to control the motion of the projector 104 with the actuator 110. The processor 130 may be further configured to process the pairs of images acquired by the imaging device 102, and generate the depth image of the object 122 in the scene 120, based at least in part on processing of the generated pairs of images of the portions of the scene 120. The image processing and generation of the depth image of the object is described below in detail.

The resulting depth image of the object 122 may be provided to a display 132 and/or stored in a memory 134 of the apparatus 100, depending on a configuration of the apparatus 100. The memory 134 may store instructions (e.g., in a control module 140) for operating the processor 130 to perform the projector 104 motion control and process the acquired pairs of images of portions of the scene 120, to generate a depth image of the object 122 in the scene 120.

FIG. 1 represents a co-planar setup of the projector and the camera. This may be done without loss of generality, since the image may be rectified and made co-planar. The processes of rectification may include geometrical transformation of the image, according to the geometry of the camera-projector system. The result of this process may be a virtual camera that is co-planar and distortion free. In embodiments, the depth data of each provided pixel (e.g., a distance from the camera 106 (108) to a point on the object 122 that corresponds to the provided pixel) may be triangulated based on the baseline distance B between the cameras 106, 108 and the depth image may be created accordingly.

The apparatus 100 may be embodied as any external peripheral device (e.g., communicatively coupled with a computing device) or integrated device suitable for image generation and provision. The examples of computing devices that may include the apparatus 100 may include, but are not limited to, tablet computers, smartphones, laptops, gaming and media devices, mobile workstations, all-in-one devices, 2-in-1 devices, or desktop computers. In embodiments, the apparatus 100 may comprise a stand-alone device, such as a 3D still camera, a video camera, a webcam, an infrared (IR) camera or another device capable of generating video and/or images.

In general, any or all of the illustrated components of the apparatus 100 may be separate from and remote to, but communicatively coupled with, a computing device. Further, some or all of the functionalities of the apparatus 100, such as processing power and/or memory capacity, may be used or shared with an associated computing device.

Figure 2:
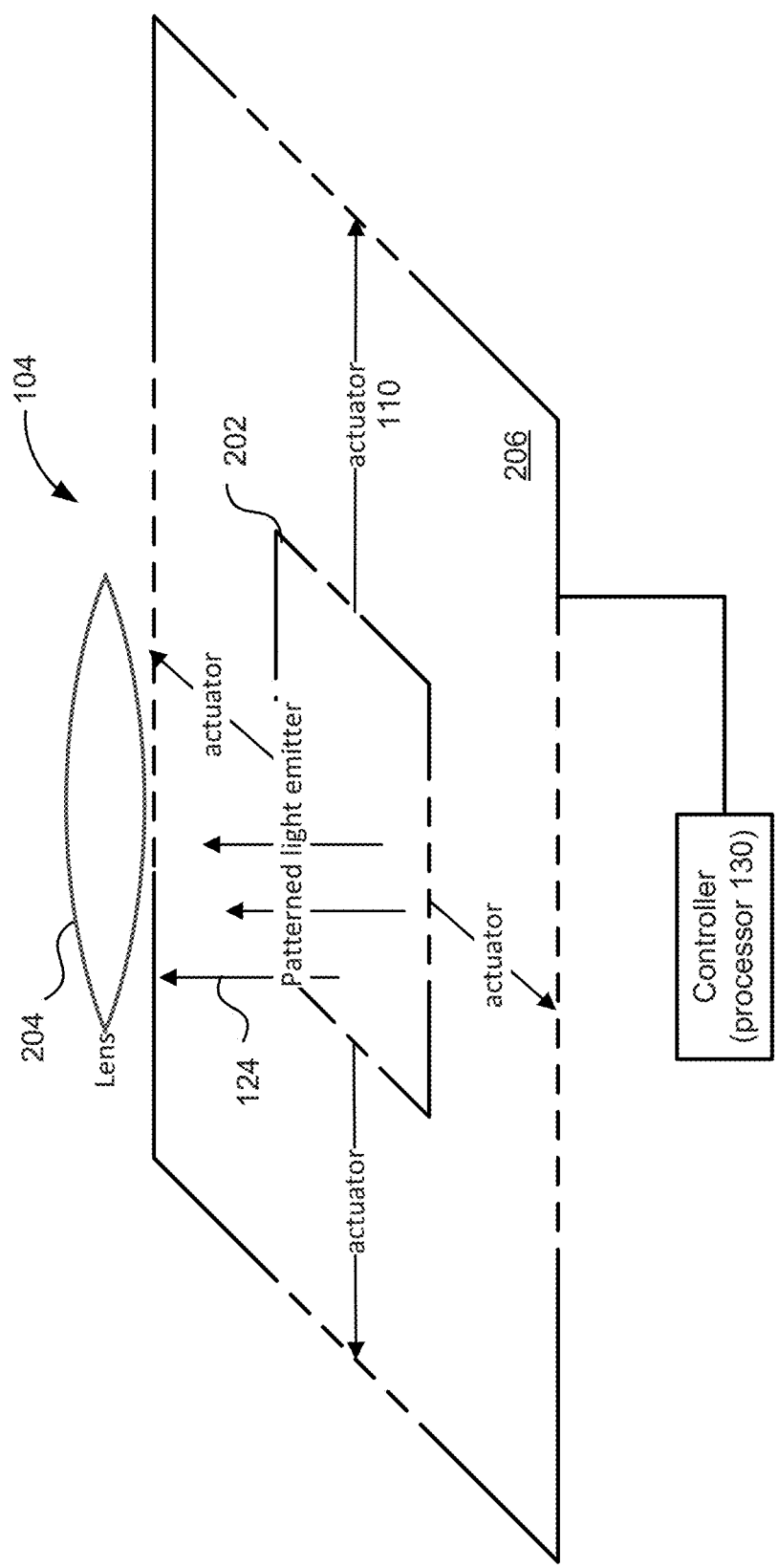
FIG. 2 is an example schematic diagram illustrating some aspects of the apparatus of FIG. 1, in accordance with some embodiments.

FIG. 2 is an example schematic diagram illustrating some aspects of the apparatus of FIG. 1, in accordance with some embodiments. For ease of understanding, like components of FIGS. 1 and 2 are indicated by like numerals.

As shown, the projector 104 may include a patterned light emitter 202 configured to emit the light pattern 124 (light spot), to be imaged by the lens 204 on a portion of a scene (not shown). A controller (e.g., processor 130) may be coupled with the actuator 110, to operate the motion of the light emitter 202 along a plane 206, to control the projection of the light pattern 124 on the portion of the scene. In some embodiments, the controller may control the motion of the lens 204 (e.g., actuate some of the lens elements), in addition or in the alternative to controlling the motion of the light emitter 202, in order to control the beam steering, to translate the projected pattern on the portion of the scene.

In general, the projector 104 may comprise a patterned projector array, disposed on an x-y mechanical translation mount. The pattern may be generated by a vertical-cavity surface-emitting laser (VCSEL) array. This array may be made of a single semiconductor chip and may generate laser sources. The array layout may be a pseudo-random arrangement. The laser sources may be directional to the perpendicular direction from the surface. An optical element (e.g., a lens) may be used to project the light into the scene ("inverse imaging"). The actuator 110 may comprise a mechanical actuator, such as a sensor shift setup, to move the laser array in parallel direction to its position. The controlled motion (beam steering) of the projector may be as follows: the projector may project a pattern (a light spot) on a scene, and a pair of images may be taken; the projector may be caused to move the pattern to a different location in the scene and stop, and another pair of images may be taken; and so on. The controller may turn off the light source and activate it for a pre-defined time only when the projector has reached the desired position. Typically, in stereo camera image processing, a template image patch (e.g., a portion of an image, such as a pixel neighborhood, or a window of a certain size) may be taken from one of the pair of images of a portion of the scene (e.g., the left image). The image patch may be matched to image patches along the same imaginary line from the other (e.g., right) image. This corresponding line is also known as the epipolar line. The camera's geometry may be known, so the images may be rectified. Hereinafter, it will be assumed that the images are rectified.

There are various metrics for matching image patches, such as normalized cross-correlation, sum of absolute differences, sum of squares, and others. When a good match is found, the distance between the template patch and the matched patch (disparity) is measured in the right image plane. The distance from the camera to the patch may then be calculated using the following equation: $z=f*B/d$, where z is the distance from the camera, f is the focal length of the camera, B is the baseline (distance between the two cameras as shown in FIG. 1), and d is disparity (for a planar setup). In general, B may be the distance between virtual cameras, after the image has been rectified. The main issue with this approach is related to the amount of information in the image patch. When the image patch is in a region with low contrast (e.g., a uniform region), there may not be enough information to find a matched image patch in the other image. To solve this issue, active stereo cameras may be used, which may project an IR pattern on a scene in order to create contrast (or texture) in the entire image.

However, active depth cameras may suffer from limitations of the spatial resolution and the minimal object size that may be identified by the camera. When the image patch is too small, it may not necessarily contain sufficient information to have a distinctive matching. On the other hand, when the image patch is too large, it may contain information from image regions that may have different depth values and thus different disparity values. A large patch size may result in inaccurate calculation of a disparity value or no matching at all. Furthermore, the size of the patch may also determine the minimal object size that the camera is capable of resolving, and the effective resolution. For example, a 640×480 video graphics array (VGA) resolution stereo camera with a 8×8 window size may be able to resolve objects of minimal size of less than 8×8, and the effective resolution (the amount of independent depth measurements) may be 80×60. In other words, known solutions may need to utilize both a larger projector and a larger imager to provide a desired accuracy of a depth image, which may add to the size, cost, and power consumption of the device.

In order to reduce the patch size (and thus increase the depth map resolution), without compromising the depth quality, a projected pattern may need to be created that may be as dense as an optical system may resolve. The described embodiments may provide for improvement in image depth accuracy by controlling the motion of the projector, which may create a time-dependent projected pattern. The resulting pattern may have higher density than the patterns offered by conventional solutions. The processing of the images acquired using the controlled motion of the projector described herein may provide for a high-resolution three-dimensional depth image of an object in a scene, compared to conventional methods. In some embodiments, the processing of the pairs of images generated in response to a projection of the light pattern on a portion of a scene may include the following techniques. The projector may move the projected pattern with a particular step at a particular distance between successive image acquisitions), and pairs of images may be taken that may include the same image element of a portion of a scene (e.g., a patch or a pixel). For example, with reference to FIG. 1, the image element corresponding to a scene portion, such as the spot 150, may be found in pairs of images corresponding to the light spots 124 and 126, taken at corresponding time instances.

Figure 3:
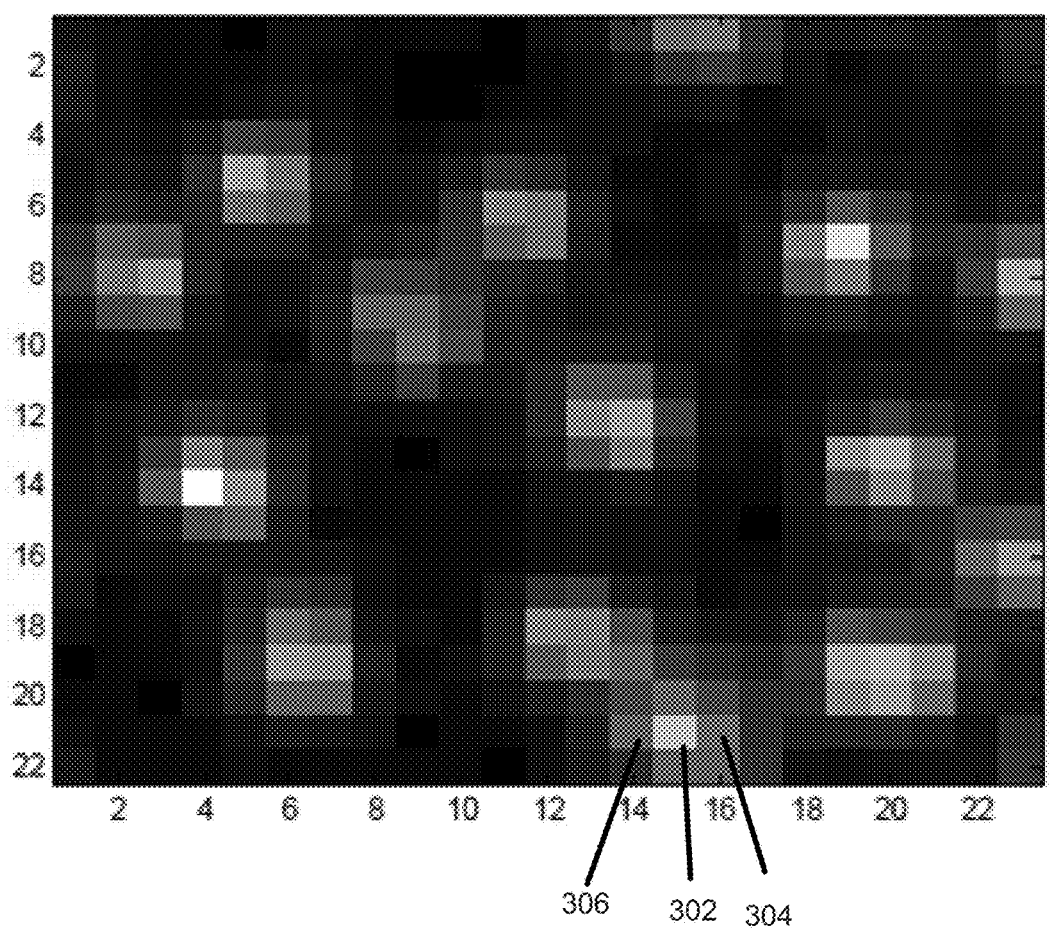
FIG. 3 illustrates an example fragment of an image of a pair of images, acquired by an apparatus of FIG. 1, in accordance with some embodiments.

FIG. 3 illustrates an example fragment of an image of a pair of images, acquired by an apparatus of FIG. 1, in accordance with some embodiments. The X and Y axes are denoted in ordinal positions of the pixels. As shown, for a single image element (e.g., a pixel indicated, for example, by numeral 302) multiple images (e.g., 304, 306) may be generated in the same pixel "neighborhood" (spatial disposition) at different (e.g., successive) time instances that may include at least portions of the image element 302. As an example, a projector may project a pattern (light spot) on a scene at a time t1, and a pair of images of the patch corresponding to that spot may be generated. The projector may then move the light spot (e.g., at a distance that is less than a size of the pattern spot), and another (successive) pair of images may be taken at a time t2. This operation may be repeated a number of times at time instances t1, t2, t3, . . . tN. Thus, an image element (or a portion of it) may be present in each of the images taken in the spatial neighborhood of this element and at different time instances. Each image may have a light intensity value associated with the image element present in the image.

Accordingly, from a series of image pairs taken at different (e.g., successive) times t1, t2, t3 . . . tN and at adjacent (or overlapping) spaces corresponding to the light patterns projected by the projector, an image patch series may be constructed from the image element (e.g., pixel 302) "neighborhood" both in space and time. In other words, from multiple images, and for each image patch, a time series, e.g., a vector of the different light intensity values at different time instances may be created. Standard stereo matching on these time series may be performed (rather than on a single patch or a spatial window according to conventional methods), by identifying disparities for corresponding pairs of images in a series, as described above. Based on the result of the matching, a high-resolution depth image of an object may be generated.

In other embodiments, the processing of the pairs of images generated in response to a projection of the light pattern on a portion of a scene may be performed as follows. A feature of an image may be predefined and stored in memory 134, to be accessible by the processor 130 of the apparatus 100. A feature may comprise a portion of an image with predefined characteristics (e.g., light intensity values). For example, a feature may be a set of light intensity values defining an image patch (e.g., corresponding to a spot 304 or 306 in FIG. 3). For example, a feature may comprise a pattern composed of multiple points, each point having a corresponding light intensity value. For processing purposes, one or more features of an image may be predefined and stored.

A feature (or features) may be tracked along multiple frames acquired from the scene. Pairs of images may be defined as [L1, R1], [L2, R2], ... [LN, RN], where L and R may correspond to images acquired by left and right cameras of the imaging device. If a feature has been identified in one of the images, e.g., L1, a matching feature may be identified in the corresponding image R1. This may be achieved, for example, by standard stereo matching described above. Further, a disparity value for the feature at each of the time instances t may be established, where disparity (denoted by d(t)), may be the difference in the x coordinate of the feature.

Further, discontinuity in disparities d(t) may be detected. Discontinuity is a mathematical notion. Namely, a small change (infinitesimal) in the motion of the pattern may yield a large change (non-infinitesimal) in the disparity. Discontinuity may define a boundary of an object in the scene, boundaries between objects, and so on. A boundary between objects (or a boundary between an object and a background of the scene) may be identified by a detection of the discontinuity in the depth image. In the embodiments described herein, discontinuity may be detected in multiple images, which may provide for better resolution of the depth image. Since the tracking of the feature can be done in a sub-pixel manner with standard feature tracking techniques (e.g., Lucas-Kanade), the discontinuity location (x,y coordinates) may readily be in sub-pixel accuracy.

Figure 4:
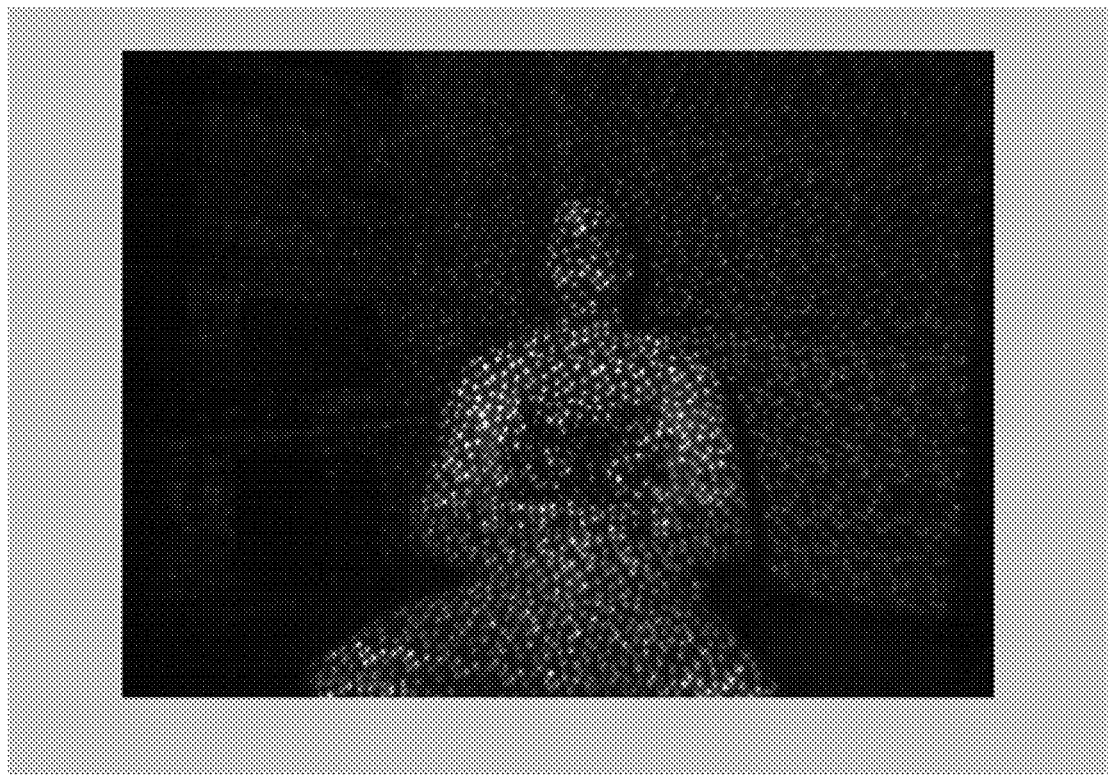
FIG. 4 is an example image of an object in a scene generated using the techniques of the present disclosure, in accordance with some embodiments.
Figure 5:
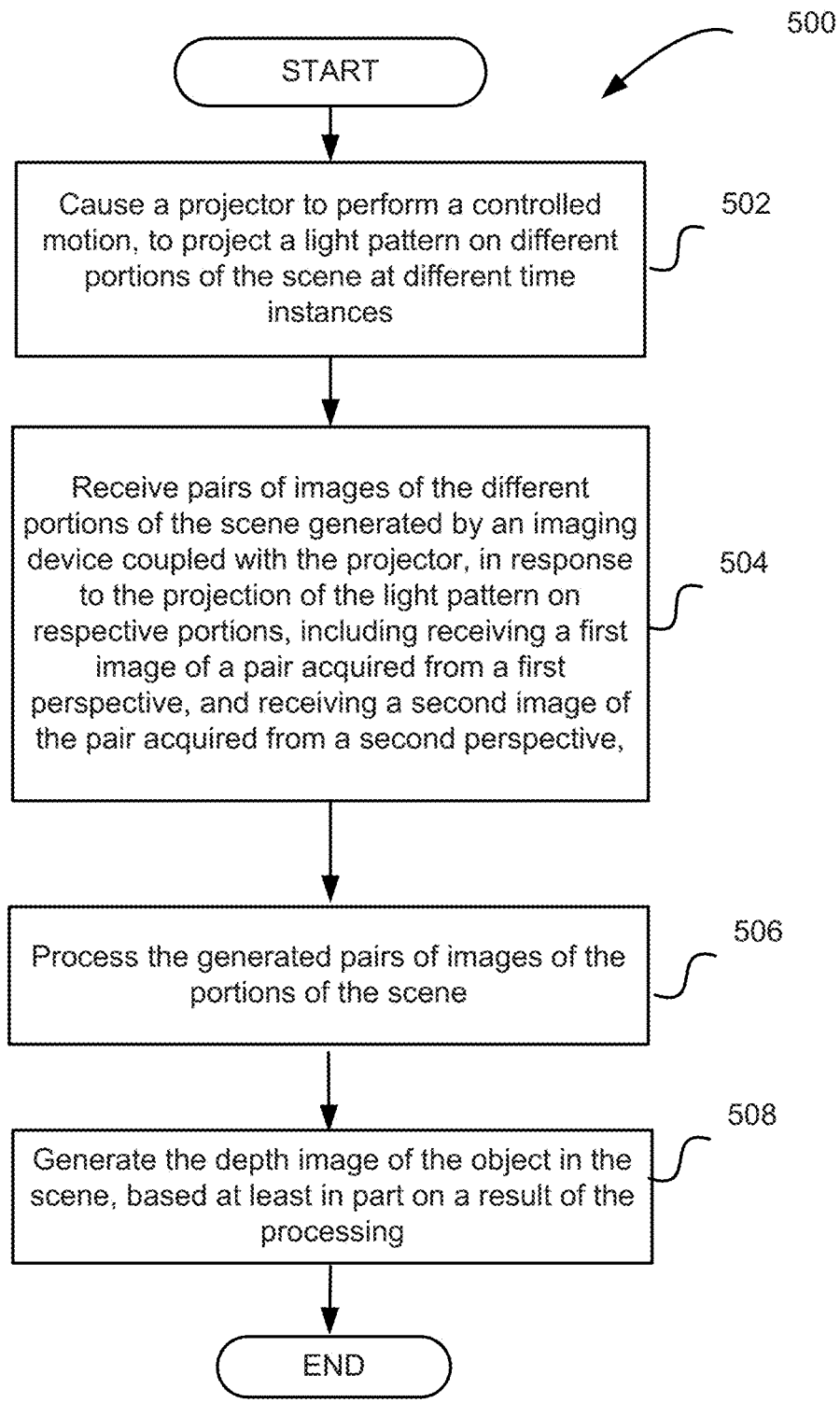
FIG. 5 illustrates an example process for providing of a depth image of an object, in accordance with some embodiments.

In other words, the location of the boundary may be detected in a fractional pixel resolution, e.g., the boundary between object and the background may be determined at pixel coordinates (e.g., x=100.25 pix, y=75.1 pix). The sub-pixel accuracy may be achieved if the projector may be moved to project the pattern (light spot) for a distance that is less than a size of the pixel, between acquisition of two successive image pairs. FIG. 4 is an example image of an object in a scene generated using the techniques of the present disclosure, in accordance with some embodiments. The object may correspond to an object 122 (a person) in the scene 120 of FIG. 1. The depth image of FIG. 4 generated according to the embodiments of this disclosure may provide for depth information at a much higher spatial (x-y) resolution than the image obtained by conventional methods. In conventional stereo matching, an image patch of a certain size, e.g., 8×8 pixels, may be matched, which means that objects that are substantially smaller that this size may not be identified. Further, the depth information may be averaged on this size, e.g., 8×8 window. For example, for a 640×480 IR image, 80×60 non-overlapping patches may be obtained and therefore 80×60 independent depth measurements may be performed. The described embodiments may work on a single pixel (over few image frames), and thus, there is no averaging over x-y, only over time, assuming that the object and camera are static. Therefore, x-y resolution will be much higher. In other words, independent depth measurements for each pixel may be obtained. FIG. 5 illustrates an example process for providing of a depth image of an object, in accordance with some embodiments. The process 500 may be performed, for example, by the apparatus 100 described in reference to FIG. 1. More specifically, the process 500 may be performed by the processor 130 in response to execution of instructions to provide the depth image that may be stored in memory 134.

The process 500 may begin at block 502, and include causing a projector (e.g., projector 104) to perform a controlled motion, to project a light pattern (e.g., 124) on different portions of a scene (e.g., 120) at different time instances.

At block 504, the process 500 may include receiving pairs of images of the different portions of the scene 120 generated by an imaging device 102 coupled with the projector 104, in response to the projection of the light pattern on respective portions. This may include receiving a first image of a pair acquired from a first perspective, and receiving a second image of the pair acquired from a second perspective, wherein the first and second perspectives may be different perspectives.

At block 506, the process 500 may include processing the generated pairs of images of the portions of the scene. The processing may be done in different ways described above. For example, the processing may be performed by stereo matching of the time series of image pairs, as further described in reference to FIG. 6. In another example, the processing may be performed by tracking image features in pairs of images, as further described in reference to FIG. 7.

At block 508, the process 500 may include generating a depth image of the object in the scene, based at least in part on a result of the processing.

Figure 6:
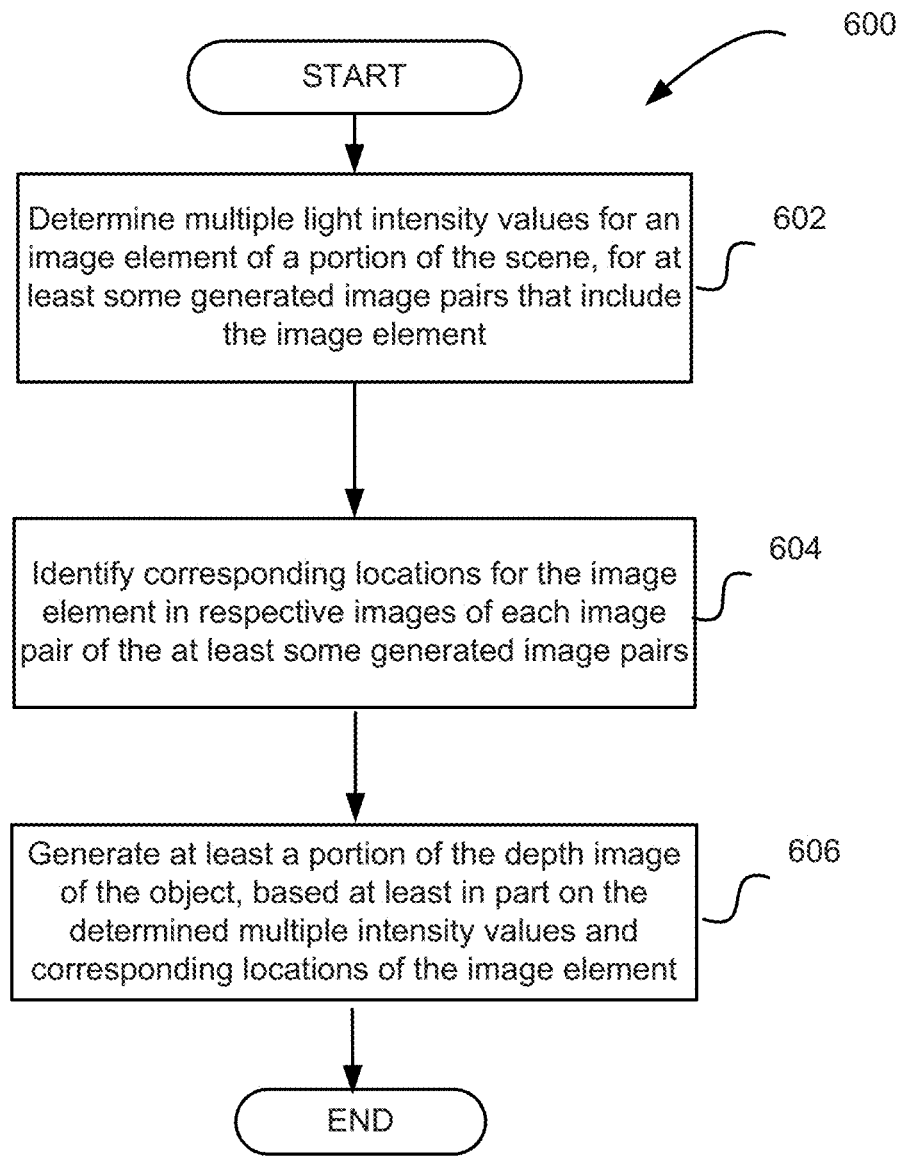
FIG. 6 illustrates an example process for processing pairs of images acquired as described in reference to FIGS. 1-5, to generate a depth image of an object, in accordance with some embodiments.

FIG. 6 illustrates an example process for processing pairs of images acquired as described in reference to FIGS. 1-5, to generate a depth image of an object, in accordance with some embodiments. The process 600 may be performed, for example, by the apparatus 100 described in reference to FIG. 1. More specifically, the process 600 may be performed by the processor 130 in response to execution of instructions to provide the depth image that may be stored in memory 134.

The process 600 may begin at block 602 and include determining multiple light intensity values for an image element of a portion of the scene, for at least some generated image pairs that include the image element.

At block 604, the process 600 may include identifying corresponding locations for the image element in respective images of each image pair of the at least some generated image pairs.

At block 606, the process 600 may include generating at least a portion of the depth image of the object, based at least in part on the determined multiple intensity values and corresponding locations of the image element.

Figure 7:
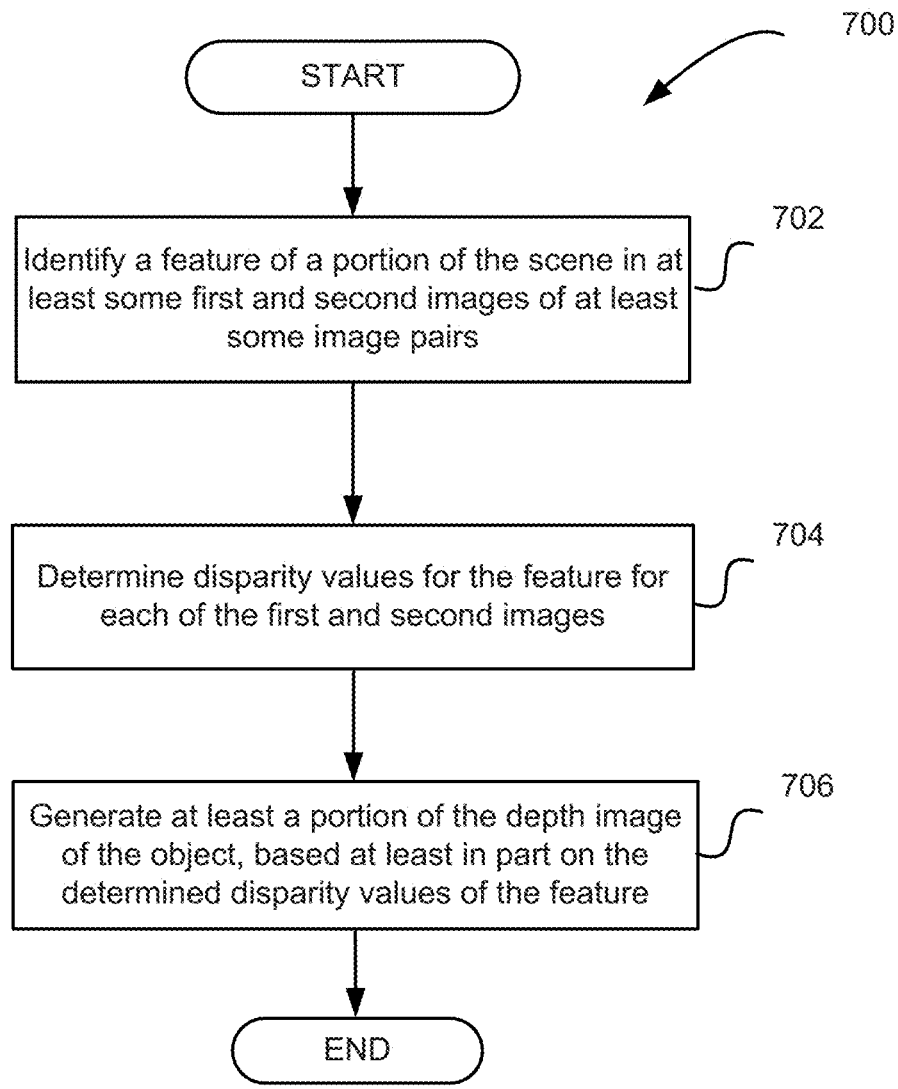
FIG. 7 illustrates another example process for processing pairs of images acquired as described in reference to FIGS. 1-5, to generate a depth image of an object, in accordance with some embodiments.

FIG. 7 illustrates another example process for processing pairs of images acquired as described in reference to FIGS. 1-5, to generate a depth image of an object, in accordance with some embodiments. The process 700 may be performed, for example, by the apparatus 100 described in reference to FIG. 1. More specifically, the process 700 may be performed by the processor 130 in response to execution of instructions to provide the depth image that may be stored in memory 134.

The process 700 may begin at block 702 and include identifying a feature of a portion of the scene in at least some first and second images of at least some image pairs. The feature may comprise a set of predetermined light intensity values associated with an image element of the first or second image.

At block 704, the process 700 may include determining disparity values for the feature for each of the first and second images.

At block 706, the process 700 may include generating at least a portion of the depth image of the object, based at least in part on the determined disparity values of the feature.

Figure 8:
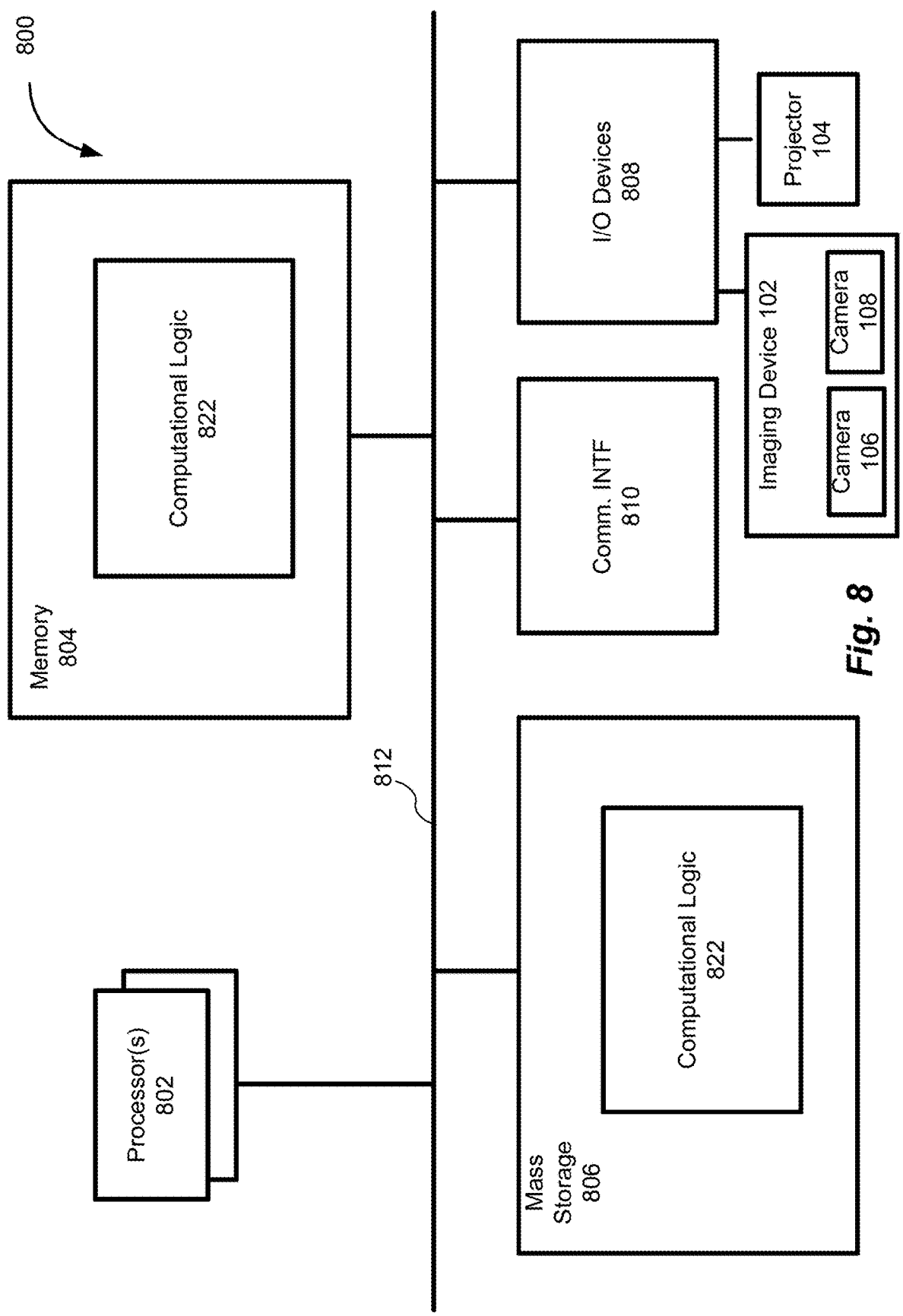
FIG. 8 illustrates an example computing device suitable for use to practice aspects of the present disclosure, such as with an apparatus for provision of a depth image, in accordance with various embodiments.

FIG. 8 illustrates an example computing device 800 suitable for use to practice aspects of the present disclosure, such as with an apparatus for provision of a depth image, in accordance with various embodiments. As shown, computing device 800 may include one or more processors 802, each having one or more processor cores, and system memory 804. The processor 802 may be implemented as an integrated circuit having single or multi-cores, e.g., a multi-core microprocessor.

The computing device 800 may include mass storage devices 806 (such as solid state drives, volatile memory (e.g., dynamic random-access memory (DRAM)), and so forth). In general, system memory 804 and/or mass storage devices 806 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth. System memory 804 and/or mass storage devices 806 may include respective copies of programming instructions configured to perform operations related to apparatus 100, for example, collectively denoted as computational logic 822.

The computing device 800 may further include input/output (I/O) devices 808 (such as a display (e.g., display 132 of FIG. 1), soft keyboard, touch sensitive screen, image capture device, and so forth) and communication interfaces 810 (such as network interface cards, modems, infrared receivers, radio receivers (e.g., Near Field Communication (NFC), Bluetooth, WiFi, 4G/8G Long-Term Evolution (LTE)), and so forth). In embodiments, the computing device 800 may comprise, or include the components of, the apparatus 100 of FIG. 1. In some embodiments, the I/O devices may include an imaging device 102 (which may include cameras 106 and 108) and projector 104, as described in reference to FIG. 1.

The communication interfaces 810 may include communication chips (not shown) that may be configured to operate the device 800 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 810 may operate in accordance with other wireless protocols in other embodiments.

The above-described computing device 800 elements may be coupled to each other via system bus 812, which may represent one or more buses. In the case of multiple buses, they may be bridged by one or more bus bridges (not shown). Each of these elements may perform its conventional functions known in the art. In particular, system memory 804 and mass storage devices 806 may be employed to store a working copy and a permanent copy of the programming instructions implementing the operations associated with the apparatus 100 of FIG. 1. The various elements may be implemented by assembler instructions supported by processor(s) 802 or high-level languages that may be compiled into such instructions.

The permanent copy of the programming instructions of computational logic 822 may be placed into permanent storage devices 806 in the factory, or in the field, through, for example, a distribution medium (not shown), such as a compact disc (CD), or through communication interfaces 810 (from a distribution server (not shown)). That is, one or more non-transitory distribution media having an implementation of the agent program may be employed to distribute the agent and to program various computing devices. In embodiments, the distribution media may be transitory, e.g., signals encoded with the instructions.

The number, capability, and/or capacity of the elements 808, 810, 812 may vary, depending on whether computing device 800 is used as a stationary computing device, such as a set-top box or desktop computer, or a mobile computing device, such as a tablet computing device, laptop computer, game console, or smartphone. Their constitutions are otherwise known, and accordingly will not be further described.

At least one of processors 802 may be packaged together with memory having computational logic 822 configured to practice aspects of embodiments described in reference to FIGS. 1-7. For one embodiment, at least one of processors 802 may be packaged together with memory having computational logic 822 to form a System in Package (SiP) or a System on Chip (SoC). For at least one embodiment, the SoC may be utilized to form the control module 140 of FIG. 1.

In various implementations, the computing device 800 may comprise a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, a game console, an entertainment control unit, a digital camera, a portable music player, or a digital video recorder. In further implementations, the computing device 800 may be any other electronic device that processes data and that utilizes depth images of objects provided by the apparatus 100 of FIG. 1.

The following paragraphs describe examples of various embodiments.

Example 1 may be an apparatus for providing a depth image of an object in a scene, comprising: a projector to perform a controlled steering of a light pattern on different portions of the scene at different time instances; an imaging device coupled with the projector, to generate pairs of images of the different portions of the scene in response to the projection of the light pattern on respective portions, wherein to generate pairs of images includes, for a portion of the scene, to acquire a first image of a pair from a first perspective, and acquire a second image of the pair from a second perspective, wherein the first and second perspectives are different perspectives; and a processor coupled with the projector and the imaging device, to control the steering of the light pattern, and generate the depth image of the object in the scene, based at least in part on processing of the generated pairs of images of the portions of the scene.

Example 2 may include the subject matter of Example 1, wherein the apparatus further comprises an actuator coupled with the projector, wherein the processor is to operate the actuator to control motion of the projector to project the light pattern around the scene.

Example 3 may include the subject matter of Example 1, wherein the imaging device comprises a first camera and a second camera disposed at a distance from and in a plane with the first camera, wherein the first and second perspectives are defined at least in part by the distance between the first and second cameras.

Example 4 may include the subject matter of Example 1, wherein the imaging device comprises a camera, wherein the camera is to acquire one of the first or second images of the pair, and the processor is to generate another one of the first or second images of the pair, based at least in part on a position of the projector relative to the scene, at a time instance of a projection of the light pattern on a respective portion of the scene.

Example 5 may include the subject matter of Example 4, wherein the camera includes an infrared (IR) camera.

Example 6 may include the subject matter of Example 1, wherein the light pattern comprises one or more light spots.

Example 7 may include the subject matter of Example 1, wherein the projector to project a light pattern on different portions of a scene at different time instances includes to move the projector to project the light pattern around the scene in a random fashion.

Example 8 may include the subject matter of Example 1, wherein the processor is to process the generated pairs of images, wherein to process includes: determine multiple light intensity values for an image element of a portion of the scene, for at least some generated image pairs that include the image element; identify corresponding locations for the image element in respective images of each image pair of the at least some generated image pairs; and generate at least a portion of the depth image of the object, based at least in part on the determined multiple intensity values and corresponding locations of the image element.

Example 9 may include the subject matter of Example 8, wherein the image element includes one or more pixels of an image of the portion of the scene.

Example 10 may include the subject matter of Example 8, wherein the projector to perform a controlled steering includes to cause the light pattern to move for a distance that is less than a size of the image element, between acquisition of two successive image pairs.

Example 11 may include the subject matter of Example 1, wherein the processor is to process the generated pairs of images, wherein to process includes: identify a feature of a portion of the scene in at least some first and second images of at least some image pairs; determine disparity value for the feature for each of the at least some image pairs; and generate at least a portion of the depth image of the object, based at least in part on the determined disparity values of the feature, wherein the feature comprises a set of predetermined light intensity values associated with an image element of the first or second image.

Example 12 may include the subject matter of Example 11, wherein to identify a feature includes to: retrieve a data set indicative of the feature from a memory accessible by the processor; and compare the retrieved feature data set with corresponding data sets associated with the first and second images of the portion of the scene.

Example 13 may include the subject matter of Example 11, wherein the image element comprises a pixel, wherein the projector to perform a controlled steering includes to cause the light pattern to move for a distance that is less than a size of the pixel, between acquisition of two successive image pairs.

Example 14 may include the subject matter of Example 11, wherein to process further includes to detect discontinuity for the feature, based at least in part on the disparity values.

Example 15 may be a computing device-implemented method for providing a depth image of an object in a scene, comprising: causing, by a computing device, a projector to perform a controlled steering, to project a light pattern on different portions of the scene at different time instances; receiving, by the computing device, pairs of images of the different portions of the scene generated by an imaging device coupled with the projector, in response to the projection of the light pattern on respective portions, including, for a portion of the scene, receiving a first image of a pair acquired from a first perspective, and receiving a second image of the pair acquired from a second perspective, wherein the first and second perspectives are different perspectives; processing, by the computing device, the generated pairs of images of the portions of the scene; and generating, by the computing device, the depth image of the object in the scene, based at least in part on a result of the processing.

Example 16 may include the subject matter of Example 15, wherein processing includes: determining, by the computing device, multiple light intensity values for an image element of a portion of the scene, for at least some generated image pairs that include the image element; identifying, by the computing device, corresponding locations for the image element in respective images of each image pair of the at least some generated image pairs; and generating, by the computing device, at least a portion of the depth image of the object, based at least in part on the determined multiple intensity values and corresponding locations of the image element.

Example 17 may include the subject matter of Example 16, wherein the image element includes one or more pixels of an image of the portion of the scene, wherein causing a projector to perform a controlled steering includes causing, by the computing device, the light pattern to move for a distance that is less than a size of the image element, between acquisition of two successive image pairs.

Example 18 may include the subject matter of Example 15, wherein processing includes: identifying, by the computing device, a feature of a portion of the scene in at least some first and second images of at least some image pairs; determining, by the computing device, disparity values for the feature for each of the at least some image pairs; and generating, by the computing device, at least a portion of the depth image of the object, based at least in part on the determined disparity values of the feature, wherein the feature comprises a set of predetermined light intensity values associated with an image element of the first or second image.

Example 19 may include the subject matter of Example 18, wherein identifying a feature of a portion of the scene includes: retrieving, by the computing device, a data set indicative of the feature from a memory accessible by the processor; and comparing, by the computing device, the retrieved feature data set with corresponding data sets associated with the first and second images of the portion of the scene.

Example 20 may include the subject matter of Example 18, wherein the image element comprises a pixel, wherein causing the projector to perform a controlled steering includes causing, by the computing device, the light pattern to move for a distance that is less than a size of the pixel, between acquisition of two successive image pairs.

Example 21 may be one or more non-transitory computing device-readable media having instructions for providing a depth image of an object in a scene stored thereon that, in response to execution on a computing device, cause the computing device to: cause a projector to perform a controlled steering, to project a light pattern on different portions of the scene at different time instances; receive pairs of images of the different portions of the scene generated by an imaging device coupled with the projector, in response to the projection of the light pattern on respective portions, including, for a portion of the scene, receive a first image of a pair acquired from a first perspective, and receive a second image of the pair acquired from a second perspective, wherein the first and second perspectives are different perspectives; process the generated pairs of images of the portions of the scene; and generate the depth image of the object in the scene, based at least in part on a result of the processing.

Example 22 may include the subject matter of Example 21, wherein the instructions that cause the computing device to process the generated pairs of images of the portions of the scene further cause the computing device to: determine multiple light intensity values for an image element of a portion of the scene, for at least some generated image pairs that include the image element; identify corresponding locations for the image element in respective images of each image pair of the at least some generated image pairs; and generate at least a portion of the depth image of the object, based at least in part on the determined multiple intensity values and corresponding locations of the image element.

Example 23 may include the subject matter of Example 22, wherein the image element includes one or more pixels of an image of the portion of the scene, wherein the instructions to cause a projector to perform a controlled steering include further cause the computing device to initiate the light pattern to move for a distance that is less than a size of the image element, between acquisition of two successive image pairs.

Example 24 may include the subject matter of 21, wherein the instructions that cause the computing device to process the generated pairs of images of the portions of the scene further cause the computing device to: identify a feature of a portion of the scene in at least some first and second images of at least some image pairs; determine disparity values for the feature for each of the at least some image pairs; and generate at least a portion of the depth image of the object, based at least in part on the determined disparity values of the feature, wherein the feature comprises a set of predetermined light intensity values associated with an image element of the first or second image.

Example 25 may include the subject matter of Example 24, wherein the instructions that cause the computing device to identify a feature of a portion of the scene further cause the computing device to: retrieve a data set indicative of the feature from a memory accessible by a processor; and compare the retrieved feature data set with corresponding data sets associated with the first and second images of the portion of the scene.

Example 26 may be an apparatus for providing a depth image of an object in a scene, comprising: means for causing a projector to perform a controlled steering, to project a light pattern on different portions of the scene at different time instances; means for receiving pairs of images of the different portions of the scene generated by an imaging device coupled with the projector, in response to the projection of the light pattern on respective portions, including, for a portion of the scene, receiving a first image of a pair acquired from a first perspective, and receiving a second image of the pair acquired from a second perspective, wherein the first and second perspectives are different perspectives; means for processing the generated pairs of images of the portions of the scene; and means for generating the depth image of the object in the scene, based at least in part on a result of the processing.

Example 27 may include the subject matter of Example 26, wherein means for processing includes: means for determining multiple light intensity values for an image element of a portion of the scene, for at least some generated image pairs that include the image element; means for identifying corresponding locations for the image element in respective images of each image pair of the at least some generated image pairs; and means for generating at least a portion of the depth image of the object, based at least in part on the determined multiple intensity values and corresponding locations of the image element.

Example 28 may include the subject matter of 27, wherein the image element includes one or more pixels of an image of the portion of the scene, wherein means for causing a projector to perform a controlled steering includes means for causing the light pattern to move for a distance that is less than a size of the image element, between acquisition of two successive image pairs.

Example 29 may include the subject matter of Example 26, wherein means for processing includes: means for identifying a feature of a portion of the scene in at least some first and second images of at least some image pairs; means for determining disparity values for the feature for each of the at least some image pairs; and means for generating at least a portion of the depth image of the object, based at least in part on the determined disparity values of the feature, wherein the feature comprises a set of predetermined light intensity values associated with an image element of the first or second image.

Example 30 may include the subject matter of Example 29, wherein means for identifying a feature of a portion of the scene includes: means for retrieving a data set indicative of the feature from a memory accessible by a processor; and means for comparing the retrieved feature data set with corresponding data sets associated with the first and second images of the portion of the scene.

Example 31 may include the subject matter of Example 29, wherein the image element comprises a pixel, wherein means for causing the projector to perform a controlled steering includes means for causing the light pattern to move for a distance that is less than a size of the pixel, between acquisition of two successive image pairs.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What is claimed is:

1. An apparatus for providing a depth image of an object in a scene, comprising:
   a projector to perform a controlled steering of a light pattern on different portions of the scene at different time instances;
   an imaging device coupled with the projector, to generate pairs of images of the different portions of the scene in response to the projection of the light pattern on respective portions, wherein to generate pairs of images includes, for a portion of the scene, to acquire a first image of a pair from a first perspective, and acquire a second image of the pair from a second perspective, wherein the first and second perspectives are different perspectives; and
   a processor coupled with the projector and the imaging device, to control the steering of the light pattern, process the generated pairs of images, and generate the depth image of the object in the scene, based at least in part on processing of the generated pairs of images of the portions of the scene, wherein to process includes:

determine multiple light intensity values for an image element of a portion of a scene, for at least some generated image pairs that include the image element;

identify corresponding locations for the image element in respective images of each image pair of the at least some generated image pairs, based at least in part on the multiple light intensity values for the image element determined; and generate at least a portion of the depth image of the object, based at least in part on the determined multiple light intensity values and corresponding locations of the image element, wherein the projector is to cause the light pattern to move for a distance that is less than a size of the image element, between acquisition of two successive pairs of images.

2. The apparatus of claim 1, wherein the apparatus further comprises an actuator coupled with the projector, wherein the processor is to operate the actuator to control motion of the projector to project the light pattern around the scene.

3. The apparatus of claim 1, wherein the imaging device comprises a first camera and a second camera disposed at a distance from and in a plane with the first camera, wherein the first and second perspectives are defined at least in part by the distance between the first and second cameras.

4. The apparatus of claim 1, wherein the imaging device comprises a camera, wherein the camera is to acquire one of the first or second images of the pair, and the processor is to generate another one of the first or second images of the pair, based at least in part on a position of the projector relative to the scene, at a time instance of a projection of the light pattern on a respective portion of the scene.

5. The apparatus of claim 4, wherein the camera includes an infrared (IR) camera.

6. The apparatus of claim 1, wherein the light pattern comprises one or more light spots.

7. The apparatus of claim 1, wherein the projector to project a light pattern on different portions of a scene at different time instances includes to move the projector to project the light pattern around the scene in a random fashion.

8. The apparatus of claim 1, wherein the image element includes one or more pixels of an image of the portion of the scene.

9. The apparatus of claim 1, wherein the processor is to process the generated pairs of images, wherein to process includes:

identify a feature of a portion of the scene in at least some first and second images of at least some image pairs;

determine a disparity value for the feature for each of the at least some image pairs; and generate at least a portion of the depth image of the object, based at least in part on the determined disparity values of the feature, wherein the feature comprises a set of predetermined light intensity values associated with an image element of the first or second image.

10. The apparatus of claim 9, wherein to identify a feature includes to:

retrieve a data set indicative of the feature from a memory accessible by the processor; and compare the retrieved feature data set with corresponding data sets associated with the first and second images of the portion of the scene.

11. The apparatus of claim 9, wherein the image element comprises a pixel, wherein the projector to perform a controlled steering includes to cause the light pattern to move for a distance that is less than a size of the pixel, between acquisition of two successive image pairs.

12. The apparatus of claim 9, wherein to process further includes to detect discontinuity for the feature, based at least in part on the disparity values.

13. An apparatus, comprising:

a projector to perform a controlled steering of a light pattern on different portions of a scene at different time instances;

an imaging device coupled with the projector, to generate pairs of images of the different portions of the scene in response to the projection of the light pattern on respective portions, wherein to generate pairs of images includes, for a portion of the scene, to acquire a first image of a pair from a first perspective, and acquire a second image of the pair from a second perspective, wherein the first and second perspectives are different perspectives; and a processor coupled with the projector and the imaging device, to control the steering of the light pattern, process the generated pairs of images, and generate a depth image of an object in the scene, based at least in part on processing of the generated pairs of images of the portions of the scene, wherein the projector is to cause the light pattern to move for a distance that is less than a size of an image element in the portion of the scene, between acquisition of two successive pairs of images to generate the pairs of images of the different portions of the scene.

14. A computing device-implemented method for providing a depth image of an object in a scene, comprising:

causing, by a computing device, a projector to perform a controlled steering, to project a light pattern on different portions of the scene at different time instances;

receiving, by the computing device, pairs of images of the different portions of the scene generated by an imaging device coupled with the projector, in response to the projection of the light pattern on respective portions, including, for a portion of the scene, receiving a first image of a pair acquired from a first perspective, and receiving a second image of the pair acquired from a second perspective, wherein the first and second perspectives are different perspectives;

processing, by the computing device, the generated pairs of images of the portions of the scene, which includes:

determining multiple light intensity values for an image element of a portion of the scene, for at least some generated image pairs that include the image element;

identifying corresponding locations for the image element in respective images of each image pair of the at least some generated image pairs; and generating at least a portion of the depth image of the object, based at least in part on the determined multiple light intensity values and corresponding locations of the image element, wherein the image element includes one or more pixels of an image of the portion of the scene, wherein causing the projector to perform a controlled steering includes causing the light pattern to move for a distance that is less than a size of the image element, between acquisition of two successive image pairs; and generating, by the computing device, the depth image of the object in the scene, based at least in part on a result of the processing.

15. The computing device-implemented method of claim 14, wherein processing includes:
identifying, by the computing device, a feature of a portion of the scene in at least some first and second images of at least some image pairs;
determining, by the computing device, disparity values for the feature for each of the at least some image pairs; and
generating, by the computing device, at least a portion of the depth image of the object, based at least in part on the determined disparity values of the feature,
wherein the feature comprises a set of predetermined light intensity values associated with an image element of the first or second image.

16. The computing device-implemented method of claim 15, wherein identifying a feature of a portion of the scene includes:
retrieving, by the computing device, a data set indicative of the feature from a memory accessible by a processor; and
comparing, by the computing device, the retrieved feature data set with corresponding data sets associated with the first and second images of the portion of the scene.

17. The computing device-implemented method of claim 15, wherein the image element comprises a pixel, wherein causing the projector to perform a controlled steering includes causing, by the computing device, the light pattern to move for a distance that is less than a size of the pixel, between acquisition of two successive image pairs.

18. One or more non-transitory computing device-readable media having instructions for providing a depth image of an object in a scene stored thereon that, in response to execution on a computing device, cause the computing device to:
cause a projector to perform a controlled steering, to project a light pattern on different portions of the scene at different time instances;
receive pairs of images of the different portions of the scene generated by an imaging device coupled with the projector, in response to the projection of the light pattern on respective portions, including, for a portion of the scene, receive a first image of a pair acquired from a first perspective, and receive a second image of the pair acquired from a second perspective, wherein the first and second perspectives are different perspectives;
process the generated pairs of images of the portions of the scene, which includes to:
determine multiple light intensity values for an image element of a portion of the scene, for at least some generated image pairs that include the image element;
identify corresponding locations for the image element in respective images of each image pair of the at least some generated image pairs; and
generate at least a portion of the depth image of the object, based at least in part on the determined multiple light intensity values and corresponding locations of the image element,
wherein the image element includes one or more pixels of an image of the portion of the scene, wherein the instructions to cause the projector to perform the controlled steering further cause the projector to initiate the light pattern to move for a distance that is less than a size of the image element, between acquisition of two successive image pairs; and
generate the depth image of the object in the scene, based at least in part on a result of the processing.

19. The one or more non-transitory computing device-readable media of claim 18, wherein the instructions that cause the computing device to process the generated pairs of images of the portions of the scene further cause the computing device to:
identify a feature of a portion of the scene in at least some first and second images of at least some image pairs;
determine disparity values for the feature for each of the at least some image pairs; and
generate at least a portion of the depth image of the object, based at least in part on the determined disparity values of the feature,
wherein the feature comprises a set of predetermined light intensity values associated with an image element of the first or second image.

20. The one or more non-transitory computing device-readable media of claim 19, wherein the instructions that cause the computing device to identify a feature of a portion of the scene further cause the computing device to:
retrieve a data set indicative of the feature from a memory accessible by the comping device; and
compare the retrieved feature data set with corresponding data sets associated with the first and second images of the portion of the scene.

* * * * *